United States Patent [19]

Florence, Jr.

[11] Patent Number: 4,504,171

[45] Date of Patent: Mar. 12, 1985

[54] LINER INSTALLATION TOOL AND METHOD

[75] Inventor: Henry S. Florence, Jr., Bakersfield, Calif.

[73] Assignee: Getty Synthetic Fuels, Inc., Signal Hill, Calif.

[21] Appl. No.: 528,931

[22] Filed: Sep. 2, 1983

[51] Int. Cl.³ .......................... F16L 1/00; B23P 19/04; E03B 7/00

[52] U.S. Cl. .................... 405/154; 29/234; 138/97; 405/156

[58] Field of Search .............. 405/183, 181, 180, 177, 405/174, 168, 154, 156, 155; 138/97; 29/234, 235; 254/29 R

[56] References Cited

U.S. PATENT DOCUMENTS

| | | | |
|---|---|---|---|
| 2,794,758 | 6/1957 | Harper et al. | 29/234 UX |
| 3,022,765 | 2/1962 | Xenis | 138/97 X |
| 3,139,677 | 7/1964 | Goldstein | 29/234 X |
| 3,261,084 | 7/1966 | Mirsky et al. | 29/234 |
| 3,462,825 | 8/1969 | Pope et al. | 29/451 |
| 3,546,890 | 12/1970 | Ede | 405/177 X |
| 3,551,983 | 1/1971 | Newbury | 405/177 |
| 3,598,156 | 8/1971 | Ulmer et al. | 138/143 |
| 3,680,342 | 8/1972 | Mott et al. | 405/168 X |
| 3,774,286 | 11/1973 | Reed | 29/234 |
| 3,982,402 | 9/1976 | Lang et al. | 405/168 |
| 3,998,065 | 12/1976 | Darnell | 405/181 |
| 4,003,122 | 1/1977 | Overmyer et al. | 29/234 |
| 4,009,063 | 2/1977 | Wood | 138/97 X |
| 4,104,774 | 8/1978 | Overmyer et al. | |
| 4,300,276 | 11/1981 | Davis | 29/234 |

FOREIGN PATENT DOCUMENTS 2313619  12/1976  France ................. 405/180

*Primary Examiner*—Dennis L. Taylor
*Attorney, Agent, or Firm*—Gordon L. Peterson

[57] ABSTRACT

A method of installing a liner within an underground pipe from a surface above the pipe wherein an excavation provides access to the pipe comprising installing a liner installation tool on an end portion of the liner to induce a distal curve in the liner, lowering the installation tool and liner into the excavation to induce a proximal curve in the liner and advancing the liner through the installation tool and into the underground pipe.

16 Claims, 6 Drawing Figures

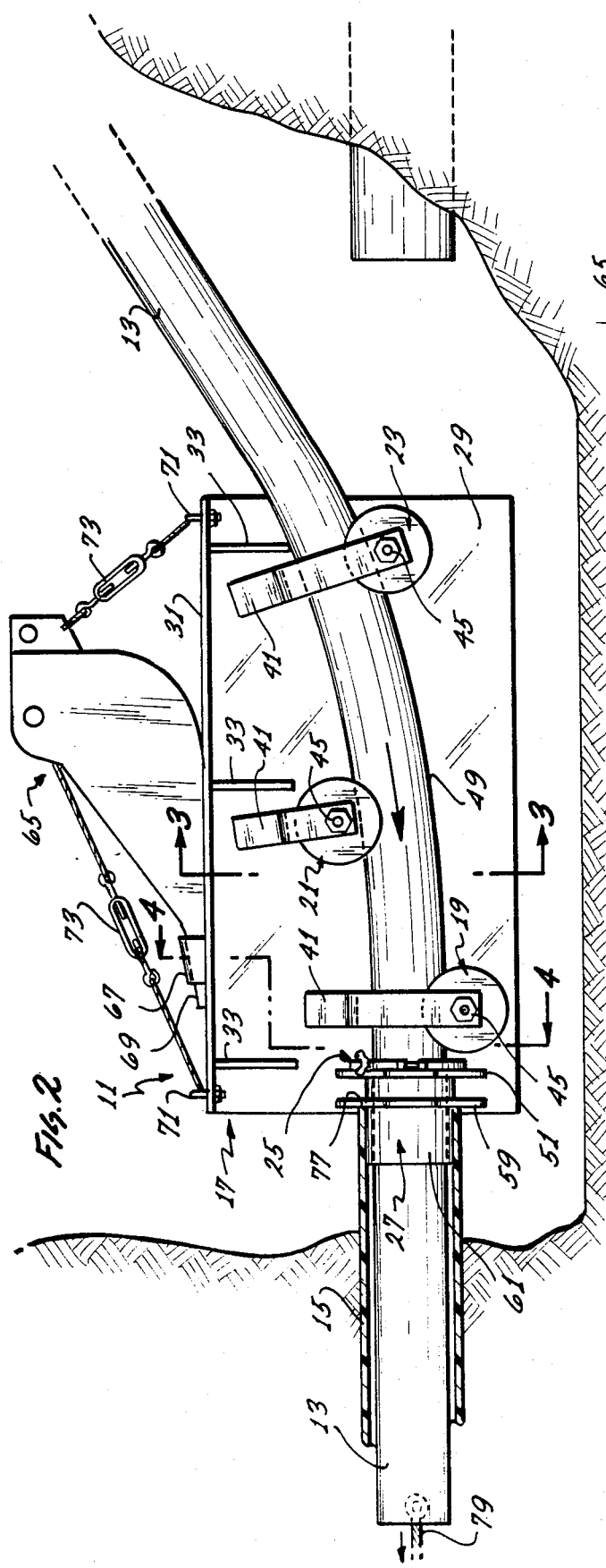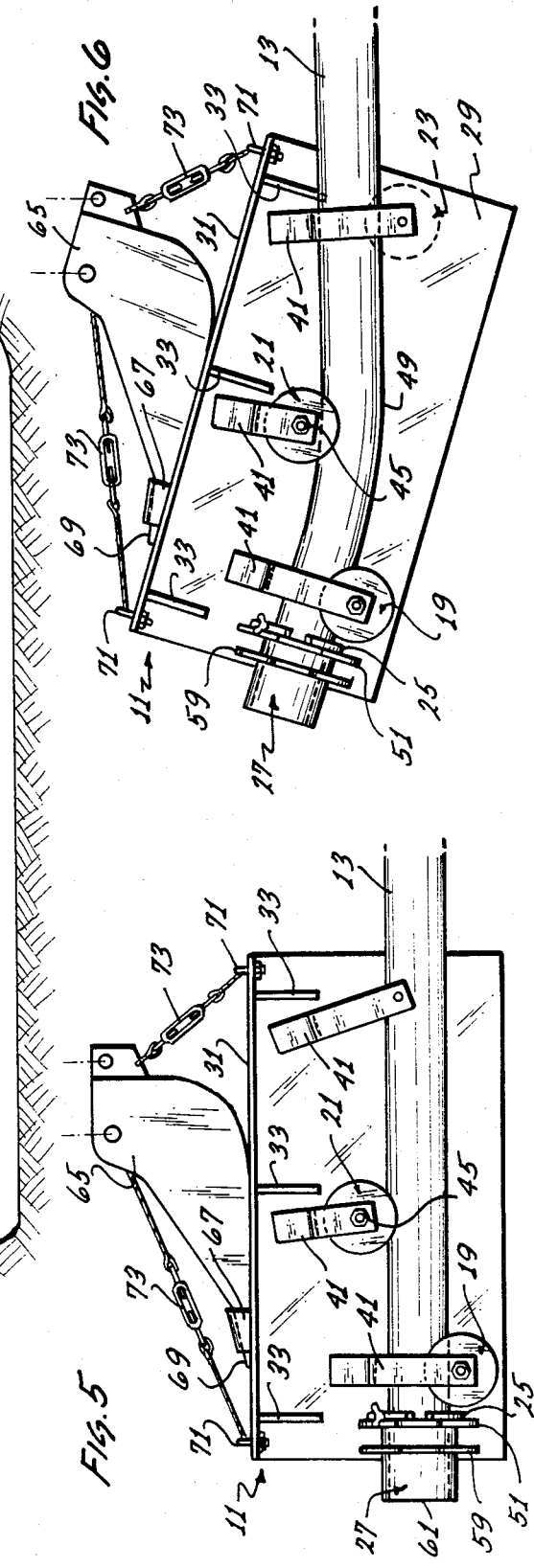

LINER INSTALLATION TOOL AND METHOD

BACKGROUND OF THE INVENTION

It is sometimes necessary or desirable to insert a liner into an existing underground pipe. For example, this may be done in order to regain use of a previously abandoned underground pipe.

To insert the liner, it is necessary to excavate to provide access to the underground pipe. Following this, a section of the underground pipe is removed to provide an open pipe end through which the liner can be inserted. The liner can then be fed from the surface into the excavation and into the open pipe end. This process can be carried out relatively easily if the liner is very flexible because a flexible liner can be relatively easily deformed into the compound curve necessary for feeding it from the surface into the open end of the underground pipe. One such technique is illustrated, by way of example, in Overmyer et al U.S. Pat. Nos. 4,003,112 and 4,104,774.

Unfortunately, for certain applications, liners for underground pipes have thick walls and are very difficult to deform. Under these circumstances, the liner cannot be sharply bent as shown, by way of example, in the Overmyer et al patents cited above. To insert a stiff liner, it may be necessary to greatly elongate the excavation so that the stiff liner can be deformed into very gradual curves. However, it is desirable to minimize the excavation particularly when the underground pipe is located beneath a city street where a long excavation would do significant damage to the street and be costly to repair. In addition, regardless of the location of the underground pipe, it is generally desirable to minimize the time and costs for a project by minimizing the size of the excavation.

SUMMARY OF THE INVENTION

This invention provides an installation tool and method for installing a liner within an underground pipe which generally overcome the disadvantages noted above. More specifically, this invention enables the installation of a relatively stiff liner within an underground pipe while minimizing the size of the excavation thereby saving time and reducing the cost of the pipe-lining procedure.

With this invention, a liner installation tool is installed on an end portion of the liner, and the liner installation tool is used to deform the liner to provide a distal curve in the liner. The liner is deformed to form a proximal curve in the liner to direct the liner downwardly into the excavation, and the distal curve directs the liner generally toward the underground pipe. The liner with the curves therein is then advanced through the installation tool and into the underground pipe.

Although the installation tool can be installed on the liner in the excavation, preferably it is at least partially installed out of the excavation. The proximal curve can advantageously be formed by lowering the installation tool and the liner into the excavation. The tool can advantageously be lowered into the excavation using a suitable powered implement, such as a backhoe. The distal curve can be provided by drivingly coupling the installation tool and the end portion of the liner and then rotating the installation tool through an appropriate angle to deform the liner.

The installation tool is used, not only to appropriately deform the liner, but also to facilitate feeding of the liner into the pipe. For this and other purposes, the tool includes guide means for guiding the liner. The guide means includes a plurality of guides, each of which preferably has a low-friction characteristic to facilitate movement of the liner through the installation tool. For example, each of the guides may include a roller rotatably mounted on the tool.

A preferred technique for installing the installation tool on the liner includes inserting an end portion of the liner between at least first and second of the guides and then rotating the tool with the end portion of the liner between the first and second guides to form the distal curve. Next, a third guide is installed to retain the distal curve in the end portion of the liner.

The installation tool preferably includes a frame, at least three guides mounted on the frame, and a releasable clamp for retaining the liner in an essentially fixed position along the guides. A distal guide engages the lower side of the liner at a distal location and an intermediate guide engages the upper side of the liner at an intermediate location proximally of the distal location. A proximal guide is removably mounted on the frame for engaging the lower side of the liner at a proximal location which is located proximally of the intermediate location and above the distal location. With this construction, the guides can curve the liner for insertion into the underground pipe.

Although the frame may be of different constructions, it can advantageously include a mounting plate on which the guides are mounted and a web coupled to the mounting plate. The installation tool preferably includes means for attachment to an implement for moving the installation tool, and such means can be provided, if desired, on the web.

Each of the guides includes means for retaining the liner against lateral movement off of the roller, and if the guides are in the form of rollers, such means can advantageously include the periphery of the roller being concave in axial cross section. The radius of such concavity is preferably larger than the radius of the unstressed liner so that there is space for the liner to assume a somewhat elliptical cross section as it is deformed. To prevent the rollers from scarring or otherwise damaging the liner, each of them is preferably constructed of a nonmetallic material, such as nylon.

The clamp is used for clamping the installation tool on the liner during installation of the tool onto the liner. This facilitates installation of the tool on the liner and formation of the distal curve in the liner. The clamp is released for feeding of the liner into the pipe.

To facilitate feeding of the liner into the pipe, the installation tool preferably includes a lead-in tube located distally of the distal guide and sized to receive the liner. The lead-in tube can be inserted into the pipe, or at least into registry therewith, to facilitate feeding of the liner into the pipe. The lead-in tube is preferably coaxial with the clamp, and the lead-in tube extends distally of the clamp.

The invention, together with additional features and advantages thereof, may best be understood by reference to the following description taken in connection with the accompanying illustrative drawing.

BRIEF DESCRIPTION OF THE DRAWING

FIG. 2 is a longitudinal, sectional view partially in elevation of the construction shown in FIG. 1.

FIGS. 5 and 6 are side elevational views illustrating the attachment of the installation tool to the end portion of the liner.

DESCRIPTION OF THE PREFERRED EMBODIMENT

Figure 1:
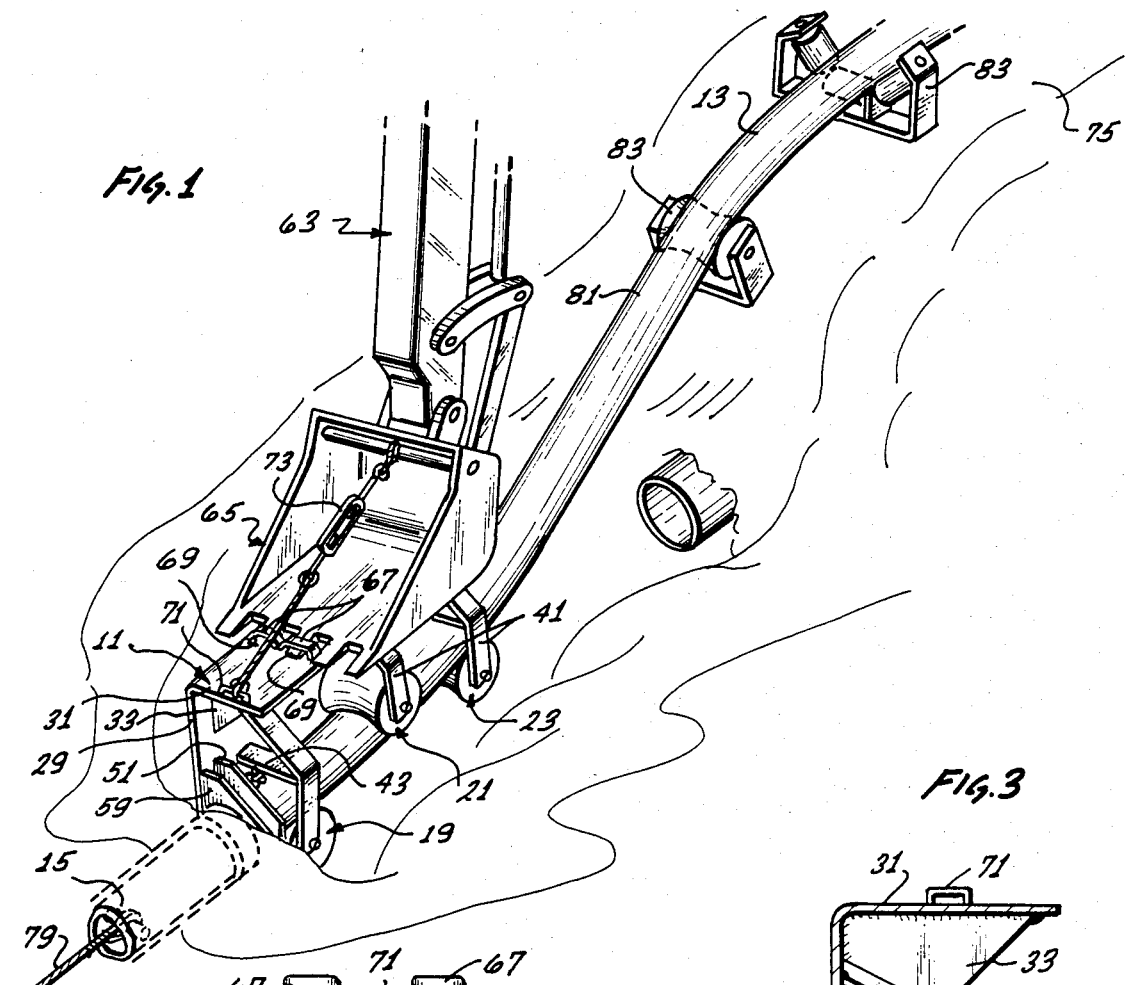
FIG. 1 is a fragmentary, isometric view illustrating the installation of a relatively rigid liner into an underground pipe in accordance with the teachings of this invention.

FIGS. 1 and 2 show an installation tool 11 being used to insert a relatively rigid liner 13 into an underground pipe 15. The installation tool 11 generally comprises a frame 17, guides in the form of a distal roller 19, an intermediate roller 21 and a proximal roller 23, a releasable clamp 25 and a lead-in tube 27.

Although the frame 17 can be of different constructions, in the embodiment illustrated, it includes a mounting plate 29, a web 31 extending at right angles to the mounting plate, and a plurality of gussets 33 welded to the mounting plate and to the web for reinforcement. The mounting plate 29 and the web 31 can be welded together or formed from a single sheet of material, such as steel, and bent into the angle configuration shown.

Figure 3:
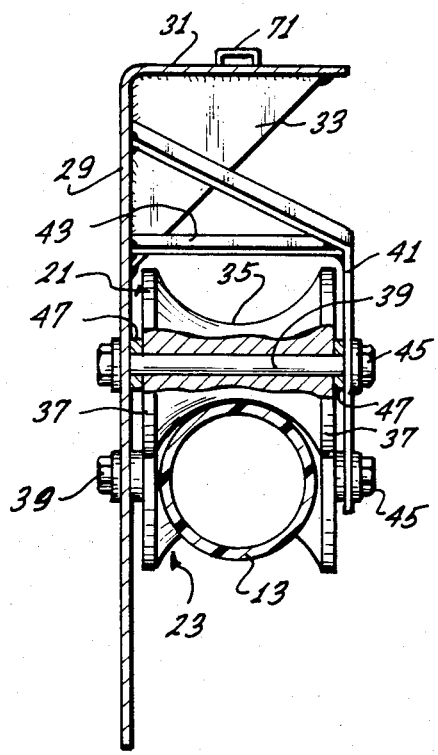

Each of the rollers 19, 21 and 23, may be identical and mounted on the mounting plate 29 in a substantially identical fashion. In this embodiment, each of the rollers is constructed of nylon and has a concave periphery 35 as viewed in axial cross section and elevation as shown in FIG. 3. With this construction, each of the rollers has flanges 37 along its opposite edges to constrain the liner 13 against lateral movement off of the rollers.

Although the rollers can be mounted in different ways, each of them is removably mounted on a bolt 39 which extends through the mounting plate 29 and through an axial bore formed in the associated roller. As shown in FIG. 3 for the roller 21, the end of the bolt 39 remote from the mounting plate 29 also extends through, and is supported by, a bracket 41, which is welded to the mounting plate and is further supported by a brace 43 which is welded to the bracket and to the mounting plate. The bolt 39 for the intermediate roller 21 is retained by a nut 45 and, if desired, washers 47 may be mounted on the bolt on the opposite faces of the roller. The rollers 19 and 23 are similarly mounted, and corresponding portions are designated by corresponding reference numerals.

When mounted in this fashion, the distal roller 19 is positioned to engage the lower side of the liner 13 at a distal location, and the intermediate roller 21 is positioned to engage the upper side of the liner at an intermediate location proximally of, and above, the distal location and the roller 19. The proximal roller 23 is positioned to engage the lower side of the liner at a proximal location proximally of the intermediate location and above the distal location. In the embodiment illustrated, each of the brackets 41 is arranged to extend generally normal (as viewed in FIG. 2) to the axis of the liner 13 to thereby provide the greatest support for the associated roller. Although various different spacings can be employed, the horizontal spacing (as viewed in FIG. 2) between the rollers 19 and 21 is less than the corresponding spacing between the rollers 21 and 23. When the rollers 19, 21 and 23 are arranged in this manner, they impart a distal curve 49 to the liner 13 as shown in FIG. 2. The vertical spacing between the rollers 19 and 21 is preferably such that the axis of the section of the liner 13 between these two rollers is essentially linear and coaxial with the axis of the pipe 15 or curved slightly upwardly from the pipe axis.

Figure 4:
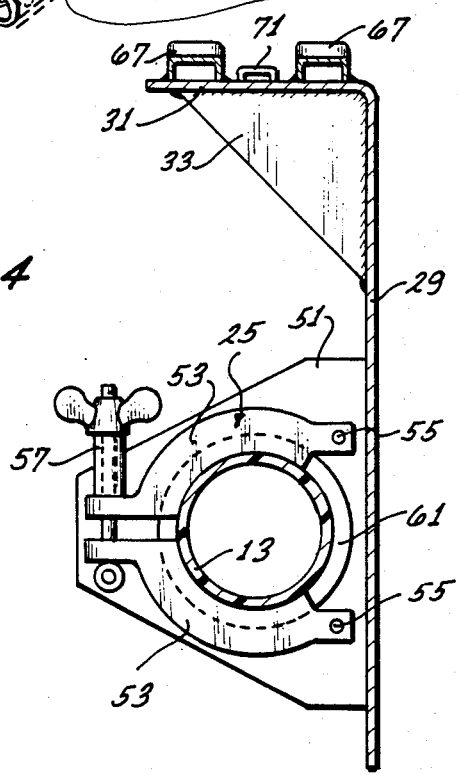
FIGS. 3 and 4 are enlarged sectional views taken respectively along lines 3—3 and 4—4 of FIG. 2.

The clamp 25 comprises a plate 51 (FIGS. 2 and 4), jaws 53 pivoted to the plate 51 by pins 55 and a threaded fastener 57 for manually tightening and releasing the jaws. By tightening the jaws 53 with the fastener 57, the jaws can grip the liner 13 to securely hold the liner in position relative to the installation tool 11.

The lead-in tube 27 includes the plate 51, a plate 59 (FIG. 2) welded to the mounting plate 29 distally of the plate 51 and a tube 61 welded within apertures in the plate 51 and 59. The tube 61 projects distally beyond the distal edge of the mounting plate 29 as shown in FIG. 2. The tube 61 is sized to receive the liner 13 and to be received within the pipe 15. Preferably, the tube 61 is coaxial with the clamp 25.

For many applications, the installation tool 11 is too large to be conveniently moved manually. Accordingly, the installation tool includes means for attaching the installation tool to a powered implement, such as a backhoe 63, and in particular, a bucket 65 of the backhoe. Although such means may take many different forms, in the embodiment illustrated, it includes a pair of hangers 67 in the form of loops welded to the web 31 for receiving teeth 69, respectively, of the bucket 65. In addition, such means comprises eyelets 71 and turnbuckles 73 attached to an associated eyelet on the web and to the bucket 65 as shown in FIG. 2.

To install the liner 13 in the pipe 15, it is first necessary to excavate from a surface 75 (FIG. 1) down to the pipe 15, and assuming that the pipe 15 is continuous, to remove a section of the pipe to provide an open end 77 (FIG. 2) of the pipe. The installation tool 11 is then mounted on the backhoe bucket 65 by insertion of the teeth 69 into the hanger 67 and by affixing the turnbuckles 73. This enables the installation tool 11 to be supported and maneuvered during use of the tool. With the installation tool 11 supported on or above the surface by the bucket and with the proximal roller 23 removed, the liner 13 is inserted between the intermediate roller 21 and the distal roller 19 through the clamp 25 and into the lead-in tube 27 as shown in FIG. 5. The clamp 25 is tightened to securely retain the liner 13 on the installation tool 11.

Next, the backhoe bucket 65 is rotated clockwise from the position shown in FIG. 5 to the position shown in FIG. 6. Because the bottom of the bucket 65 bears against the web 31, this also rotates the installation tool 11 through a corresponding angle as shown in FIG. 6. This rotation of the tool 11 bends the liner 13 into the configuration shown in FIG. 6. Accordingly, the proximal roller 23 can then be installed on the mounting plate 29 and its bracket 41 to retain the liner 13 in the curved position of FIG. 6. In this manner, the distal curve 49 is formed.

Next, the bucket 65 is counterrotated to the position shown in FIG. 5 and lowered, along with the tool 11, into the excavation. The liner 13 is then suitably attached to a pull cable 79 in a conventional manner as by fusing a plastic end cap coupled to the pull cable to the liner, and the bucket 65 is maneuvered to insert the tube 61 into the open end 77 of the pipe 15. As a result of lowering of the end portion of the liner 13 into the excavation along with the tool 11, the liner 13 is bent into a proximal curve 81 (FIG. 1). If desired, the portion of the liner 13 on and near the surface 75 can be suitably supported by roller assemblies 83. Thereafter, with the tool 11 supported by the bucket 65 or in other suitable ways, and the clamp 25 released, the liner 13 can be advanced along the rollers 19, 21 and 23 and through the tool 11 and the pipe 15 by pulling on the pull cable 79. As the liner 13 is fed into the pipe 15, the liner 13 is progressively bent through the proximal curve 81 and the distal curve 49.

Although the concepts of this invention are not limited to any particular kind of liner 13, by way of example, the liner may be a thick wall polyethylene liner. By way of illustration and not by way of limitation, the liner may be of eight-inch diameter and have a wall thickness approaching one inch.

Although an exemplary embodiment of the invention has been shown and described, many changes, modifications and substitutions may be made by one having ordinary skill in the art without necessarily departing from the spirit and scope of this invention.

I claim:

1. An installation tool for use in installing a liner within an underground pipe comprising:
   a frame;
   a distal guide mounted on the frame for engaging the lower side of the liner at a distal location;
   an intermediate guide mounted on the frame for engaging the upper side of the liner at an intermediate location proximally of the distal location;
   a proximal guide;
   means for mounting the proximal guide on the frame for engaging the lower side of the liner at a proximal location proximally of the intermediate location and above the distal location whereby the liner can be curved by the guides for insertion into the underground pipe; and
   a releasable clamp for retaining the liner in an essentially fixed position along the guides.

2. An installation tool as defined in claim 1 wherein said mounting means removably mounts the proximal guide on the frame whereby the proximal guide can be removed to facilitate installation of the liner on the installation tool.

3. An installation tool as defined in claim 1 including means on said frame for attaching the frame to a backhoe.

4. An installation tool as defined in claim 1 wherein said frame includes a mounting plate on which the guides are mounted and a web coupled to the mounting plate and the installation tool includes means on the web for attachment to an implement for moving the installation tool.

5. An installation tool as defined in claim 1 wherein at least one of said guides includes a roller rotatably mounted on the frame and the periphery of said roller is concave in axial cross section.

6. An installation tool as defined in claim 1 including a lead-in tube located distally of the distal guide and sized to receive the liner.

7. An installation tool as defined in claim 6 wherein the lead-in tube is coaxial with the clamp and the lead-in tube extends distally of the clamp.

8. An installation tool as defined in claim 7 wherein said frame includes a mounting plate on which the guides are mounted and a web coupled to the mounting plate and the installation tool includes means on the web for attachment to an implement for moving the installation tool, each of said guides includes a nonmetallic roller mounted on the mounting plate, each of said rollers includes means for retaining the liner against lateral movement off of the roller, and said mounting means removably mounts the proximal roller on the frame whereby the proximal roller can be removed to facilitate installation of the liner on the frame.

9. An installation tool for use in installing a liner within an underground pipe comprising:
   a frame;
   a distal guide mounted on the frame for engaging the lower side of the liner at a distal location;
   an intermediate guide mounted on the frame for engaging the upper side of the liner at an intermediate location proximally of the distal location;
   a proximal guide;
   means for mounting the proximal guide on the frame for engaging the lower side of the liner at a proximal location proximally of the intermediate location and above the distal location whereby the liner can be curved by the guides for insertion into the underground pipe; and
   a lead-in tube extending distally of the distal guide and sized to receive the liner.

10. A method of installing a liner within an underground pipe from a surface above the pipe wherein an excavation provides access to at least a portion of the underground pipe from said surface, said method comprising:
    installing a liner installation tool on an end portion of the liner with the installation tool deforming the liner to form at least a distal curve in the liner, said installation tool including guide means for guiding the liner;
    deforming the liner to form a proximal curve in the liner to direct the liner downwardly into the excavation, said distal curve directing the liner generally toward the pipe; and
    advancing the liner with the curves therein along the guide means, through the installation tool and into the underground pipe.

11. A method as defined in claim 10 wherein said step of installing the installation tool is at least partially carried out outside of said excavation and said step of deforming includes lowering the installation tool and the end portion of the liner into the excavation to induce said proximal curve.

12. A method as defined in claim 10 wherein said step of installing the installation tool includes drivingly coupling the installation tool and said end portion of the liner and rotating the installation tool through an angle to form said distal curve.

13. A method as defined in claim 12 wherein said guide means includes first, second and third guides, said step of installing includes inserting the end portion of the liner between the first and second guides, carrying out at least some of said step of rotating with the end portion between the first and second guides to form the distal curve and installing the third guide to retain said distal curve in said end portion of the liner.

14. A method as defined in claim 13 wherein said step of installing the installation tool includes attaching the installation tool to a powered implement and carrying out said step of rotating with said implement, said step of deforming includes lowering the installation tool and the end portion of the liner into the excavation to induce said proximal curve, and using the implement to insert a portion of the installation tool into the underground pipe.

15. A method as defined in claim 12 wherein said step of rotating the installation tool through an angle is carried out with a powered implement.

16. A method as defined in claim 10 wherein the installation tool has a lead-in tube sized to be received within the underground pipe and to receive the liner, said step of installing the installation tool includes inserting the liner into the lead-in tube, said method includes positioning the installation tool to insert the lead-in tube into the underground pipe.

* * * * *